United States Patent [19]
Lemoine et al.

[11] B 3,994,013
[45] Nov. 23, 1976

[54] LAST LINE VELOCITY COMPENSATION

[75] Inventors: Maurice G. Lemoine; Leonard A. Pasdera, both of Redwood City, Calif.

[73] Assignee: Ampex Corporation, Redwood City, Calif.

[22] Filed: Mar. 3, 1975

[21] Appl. No.: 554,939

[44] Published under the second Trial Voluntary Protest Program on February 10, 1976 as document No. B 554,939.

[52] U.S. Cl. ..................................... 358/8; 360/26; 360/36
[51] Int. Cl.² ........................................ H04N 5/795
[58] Field of Search ................ 358/8, 4; 360/36, 26, 360/32, 37; 178/6.6 TC

[56] References Cited
UNITED STATES PATENTS

| | | | |
|---|---|---|---|
| 3,428,745 | 2/1969 | Coleman | 360/36 |
| 3,659,040 | 4/1972 | Fujita | 358/8 |
| 3,716,663 | 2/1973 | Bolger | 358/8 |
| 3,717,721 | 2/1973 | Makara et al | 358/8 |

*Primary Examiner*—Howard W. Britton

[57] ABSTRACT

In last line velocity compensation of color television signals reproduced by video recorders, the velocity error signal for the next to last line of information before the head switch that occurs during the vertical blanking interval is stored for a time extending beyond the period of the last line. The switching between transducers that occurs during each vertical blanking interval is delayed so that a color burst signal following the last line is reproduced and a velocity error for the last line generated. This last line velocity error signal is differentially compared with the stored next to last line velocity error to provide a velocity error difference signal. The error difference signal is stored for the period between the foregoing and succeeding vertical blanking intervals. The stored velocity error difference signal is added to the velocity error of each of the next to last lines of video information reproduced before switching between transducers at times between such vertical blanking intervals to provide last line velocity error compensation for those intervening last line.

17 Claims, 1 Drawing Figure

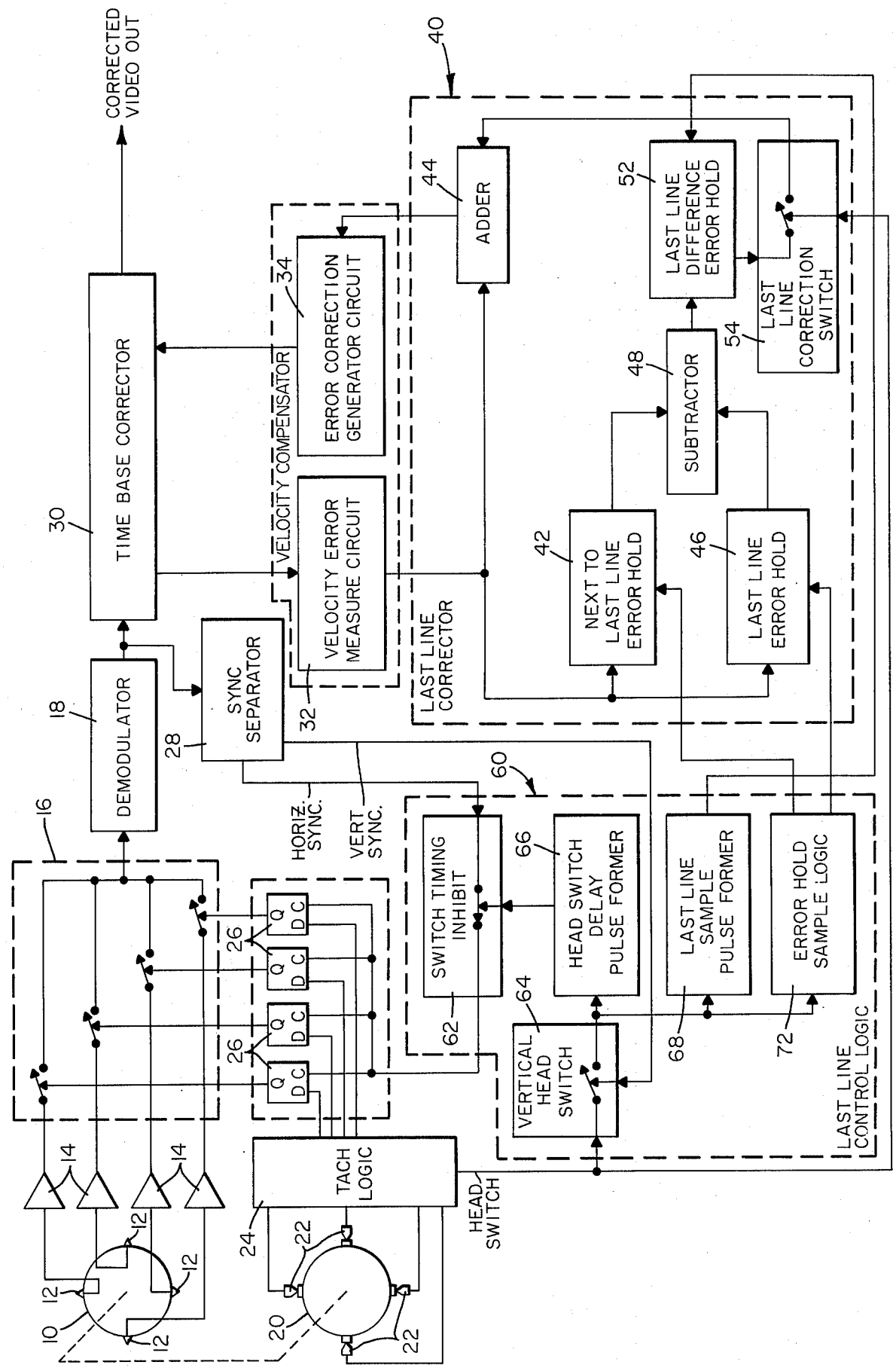

LAST LINE VELOCITY COMPENSATION

BACKGROUND OF THE INVENTION

In recording and subsequently reproducing information in a system having relatively moving record medium and transducers, time base errors commonly occur in the reproduced information. For example, in quadruplex or other video recorder and reproducer devices having rotary transducers, information is recorded on and reproduced from separate tracks along the record medium and, when a plurality of transducers are employed, with switching occurring between the transducers as successive tracks are swept. In such devices, head to tape time base errors have long been recognized and appropriate means provided for compensating such errors.

Periodic or line by line organized information signals usually have periodically occurring synchronizing intervals, which ordinarily do not contain data information. Color television signals are common examples of such line by line organized information signals. A preponderance of television recorder and reproducer devices employ two or more transducers to transfer the television signal information between signal utilization equipment and a moving record medium. For example, in magnetic recorder and reproducer devices, a plurality of magnetic head transducers are commonly used to transfer television signal information from and to magnetic tape and disc media. In magnetic tape recorder and reproducer devices, a number of heads, typically four, translate across a moving magnetic tape in a transverse, helical or arcuate manner to produce a series of non-continuous recorder tracks. Upon reproduction, the heads move in similar fashion. As each head passes across the tape, it is switched into and out of the electronic signal processing channel. Quadruplex recorder and reproducer systems record the information in tracks transversely extending across a tape record medium, with each of the tracks containing several lines of information. Commonly each line is commenced by synchronizing information followed by data information. Any time base error in the form of misposition of a line is corrected by measuring the relative time base position of the synchronizing pulse of each line and applying an appropriate delay to each line to properly position the synchronizing pulses. In wideband signal applications, the intra line time base must be more accurately maintained. In color television signals, a pilot tone or color burst signal is contained in the synchronizing information and is used to provide precise time base correction of the wideband color television signal at the beginning of each of its lines.

Such time base correction does not, however, provide compensation for the effects of progressive time base errors that occur in each line from its beginning to its end. When recording and reproducing color television signals, the progressive time base error manifests itself as a change in hue across the television line. Because such errors are due to minute changes in the relative transducer to medium velocity as the head traverses the medium, they are commonly referred to as velocity errors. In one known method of velocity error compensation utilized in reproducing recorded color television signals, the velocity error for a given television line is determined by comparing the phase of the color burst of the line to be corrected with the phase of the next succeeding line. A discrete velocity error is then determined line by line for each individual line and a corresponding time base compensation effected. An example of such a velocity compensator is described in our application filed concurrently herewith entitled "TIMING ERROR COMPENSATOR" Ser. No. 554,886. In information recorder and reproducer devices that utilize the aforementioned method of velocity compensation, it is not possible to determine the time base error of the last line of information reproduced during each head pass prior to head switching because the time base related synchronizing information of the succeeding line will be reproduced by the next head to reproduce information from the record medium and will, consequently, not have a time base continuous with that of the synchronizing information reproduced by the prior head.

As used herein, "last line" or "last period" means the last determined period of a signal that is ordinarily reproduced by one of a plurality of reproduce transducers prior to the termination of the signal reproduction by such transducer.

SUMMARY OF THE INVENTION

Accordingly, the present invention enables the determination and compensation of the last line time base error present in information signals reproduced from a recording by a plurality of transducers. The present invention is particularly useful for the determination and compensation of last line progressive time base errors in a color television signal reproduced by a recorder and reproducer device utilizing a plurality of transducers that successively scan the record medium.

In a multiple transducer recording and reproducing system wherein a blank interval, i.e., an interval devoid of essential data information, periodically occurs in the information signal, such as the vertical blanking interval between fields in a color television signal, ordinarily switching between transducers is arranged to occur during such interval. In accordance with the time base compensation technique of the present invention, the time of switching that terminates signal reproduction by a transducer is delayed to permit the reproduction of a time base related synchronizing information signal occurring in the blank interval after the location at which transducer switching normally occurs. This synchronizing signal and that normally reproduced last before head switching are compared to provide a time base error signal for use in compensating time base error. For compensating residual time base errors occurring between such blank intervals, a time base error difference signal is derived by comparing the time base error generated by delaying the transducer switching and a preceding time base error generated during signal reproduction with the same transducer. This time base error difference is selectively combined with time base error signals occurring between successive blank intervals to compensate for the effect of such residual time base errors.

Apparatus for implementing the time base compensation technique of the present invention includes means for storing synchronizing information representative of the time base at the beginning of a last determined period of data information reproduced before transducer switching occurs during a blank interval devoid of essential data information. Control means is provided to delay the actuation of the transducer switching that terminates the signal reproduction by a transducer. The delay is selected to permit the reproduction of time base representative synchronizing information, which corresponds to the stored synchronizing information and occurs in the blank interval at a location following that at which transducer switching normally occurs. A time base comparator is coupled to compare the stored and reproduced synchronizing information representations and provide a time base error signal proportional to the progressive time base error occurring in the last determined period of data information before delayed transducer switching. This last period time base error signal is coupled to a differential comparator, which also receives a corresponding time base error signal representative of the progressive time base error in the next to last determined period of data information before delayed head switching. The differential comparator provides a difference signal representative of the period to period change in the progressive time base errors, which signal is coupled for storage during subsequent transducer reproduction operations occurring between successive blank intervals. Means are provided for selectively combining this stored difference signal with last period time base error signals provided between successive blank intervals to compensate for the effect of last line residual time base errors.

The last line time base error compensation technique of the present invention is especially useful in common quadruplex color television tape recorder and reproducer devices. In such devices, 16 head passes across the tape ordinarily occur in the recording or reproduction of each television field; hence, from vertical blanking interval to vertical blanking interval. The relative head to tape motion is usually synchronized with the occurrence of the vertical blanking interval so that the portion of the television signal including the vertical blanking interval is always recorded and reproduced by the same magnetic head transducer, and the recorded vertical sync pulse included in the interval is located at about the center of one of the passes of a head transversely across the tape. About eight periods, each corresponding to the period of one horizontal line, are recorded in the last one-half of each track recorded during the head pass. The normal horizontal line synchronizing components, i.e., horizontal synchronizing pulse and color synchronizing signal, are included in the periods following the vertical sync pulse interval. During the remaining fifteen passes of the heads, the color video information is only interrupted by intervals of horizontal line synchronizing information. In accordance with the present invention, the normal head switching that terminates signal reproduction by a head, which commonly occurs in the vertical blanking interval upon the occurrence of the third horizontal sync pulse following the vertical sync pulse, is delayed to permit the reproduction of the color synchronizing signal following such horizontal sync pulse. The time base of that color synchronizing signal is compared with the time base of the color synchronizing signal preceding the last line before the third horizontal sync pulse to generate a last line time base error signal representative of the progressive time base error occurring between the compared color synchronizing signals. This last line time base error signal is subtracted from the corresponding time base error signal of the next to last line reproduced in the vertical blanking interval to provide a representation of the line to line change or difference in the progressive time base errors of the last line and next to last of the vertical blanking interval. Because the line to line change in the progressive time base errors does not vary significantly over a time equivalent to one field of a television signal, the time base error difference obtained during the vertical blanking interval is employed during subsequent head passes between successive vertical blanking intervals to provide time base error compensation of each last line of the subsequent head passes. Such time base compensation of last lines between successive vertical intervals reduces the progressive time base error of such lines to insignificant level. The manner in which this is accomplished will become more apparent upon consideration of the detailed description of an embodiment of the present invention included hereinbelow.

While the last line time base compensation technique of the present invention is especially suited for use in quadruplex video tape record and reproduce devices, the technique may be utilized in devices with any number of heads between which periodic switching occurs and residual time base errors remain in the signal at times prior to the switching. As long as the signal contains components from which its time base can be periodically determined and an interval exists in the signal information during which processing of reproduced information can be momentarily interrupted, the time base compensation technique of the present invention can be put to advantageous use.

DESCRIPTION OF A PREFERRED EMBODIMENT

The accompanying sole FIGURE schematically represents a preferred embodiment of the present invention especially suited for effecting last line signal time base compensation in color television signals reproduced from a magnetic tape medium by a quadruplex tape record and reproduce device (VTR).

Referring to the FIGURE, portions of the reproduce signal processing system of a VTR are shown to facilitate understanding the operation of the described embodiment of the present invention. A rotating head wheel 10 supports four video heads 12 for rotation across a video tape (not shown) for reproducing a recorded color television signal. Each head 12 is connected to a playback preamplifier (preamp) 14. The output of each preamp 14 is selectively connected by a switcher 16 to the input of a demodulator 18. A demodulator is commonly necessary in the signal reproducing system because the video signal is ordinarily modulated prior to recording. Switcher 16 is normally controlled to sequentially apply the reproduced signal from one head 12 at a time to demodulator 18 as the one head is traversing the tape. Head position is determined by head wheel tachometer (tach) 20. Tach 20 contains four pick-offs 22 which apply a signal to tach logic circuit 24 as each head 12 begins to traverse the tape. In a well known manner, tach logic 24 in turn generates and applies appropriate swich enable signals to four D flip-flops 26 which control switcher 16 to switch heads as one head ends its traversal of the tape and the next head begins its traversal of the tape. The precise moment of head switching is normally controlled to occur just at the beginning of a television line so as to avoid visible signal distortion due to head switching. The beginning of each line is marked by a horizontal synchronization pulse signal which is detected by sync separator 28 and applied to the D flip-flops 26 as a switching pulse. D flip-flops operate in a known way to change state as determined by an enabling signal applied to the D or data input at the moment a switching pulse is applied to the C or clock input. The proper states to which flip-flops 26 shall change at the time of head switching is determined in a common manner by tach logic 24.

Time base errors occur in a reproduced signal. Such errors include mispositioning of the horizontal synchronizing pulses and of the color synchronizing signal within each line. These time base errors are corrected once each line at the beginning of the line by a time base corrector 30. A number of time base correctors are known in the prior art. One such corrector is disclosed in copending commonly assigned, U.S. application Ser. No. 464,269, now abandoned in favor of continuation Ser. No. 557,708.

Another form of error which occurs in a reproduced signal results from changes in the relative head to tape velocity during the line and causes a progressive time base change during the period defined by each information line of the television signal. These errors are removed by velocity compensators, such as described in our above-identified application Ser. No. 554,886. That velocity compensator utilizes a velocity error measure circuit 32, which generates a velocity error signal for each line period of the television signal and applies the generated error signal to an error correction generator circuit 34. A correction signal generated by circuit 34 is applied to the output portion of the time base corrector 30 to progressively vary the time base or phase of each line period from beginning to end. Progressive intra line time base error is thereby corrected. The progressive time base or, more commonly, velocity error which occurs across each line is measured by comparing the relative phase of a stored representation of the time base or phase of the color burst synchronizing signal preceding that line with that of the color burst synchronizing signal of the next succeeding line to obtain an indication of the phase change that occurs between the color bursts. The phase change is assumed to progress linearly through line video information between color bursts. As previously discussed herein, the progressive time base error that occurs in the last line of each head pass just prior to head switching cannot be determined because the color burst of the next succeeding line occurs at the beginning of the next head pass just after head switching and, therefore, its time base is not continuous with and related to that of the last line. These last line progressive time base or velocity errors usually remain as residual time base errors in, what has heretofore been accepted as being "fully" time base compensated information signals.

Accordingly, the present invention includes a last line corrector 40 and control logic 60 to compensate for such residual time base errors. To obtain the time base information of the last line before magnetic head transducer switching in the vertical blanking interval, head switching during the vertical blanking interval is delayed so that a color burst synchronizing signal occurring in that interval following the last line is reproduced during the same head pass as the last line. Head switching can be delayed without concomitant signal distortion during the vertical blanking interval when color bursts are present because no essential video information is present and the processing of reproduced information can be momentarily interrupted for a portion of the vertical blanking interval. This frees the signal processing system in the VTR for employment in the determination of the last line time base error. In the standard quadruplex VTR, head switching also takes place at other times between vertical blanking intervals. While horizontal synchronizing intervals without data information are present between successive vertical blanking intervals, the television signal processing circuits are not ordinarily free at switching times occurring between successive vertical blanking intervals. Therefore, delaying the head switching in standard quadruplex VTR's at times other than during the vertical blanking interval will result in the introduction of unacceptable distortions in the television information signal. Hence, the present invention uses the last line time base error derived from signal time base information reproduced during the vertical blanking interval to compensate the last line time base errors occurring between such interval and a succeeding vertical blanking interval.

In the method of the present invention, the time base error occurring during the next to last line of information reproduced by a transducer before switching in the vertical blanking interval is stored, for example, by the operation of velocity error measure circuit 32 and cooperating error hold circuit 46. The time base error occurring during the last line before transducer switching in the vertical blanking interval is determined by delaying the switching of a magnetic head transducer 12 to effect the reproduction of synchronizing information containing signal time base information. The delaying of the head switching is accomplished by the cooperation of the tach logic 24 and control logic 60. The last line time base error is generated by comparing, in the velocity error measure 32, the time bases of the synchronizing information reproduced after the last line and the reproduced and stored synchronizing information preceding the last line. Following the determination of the last line time base error, the last line corrector 40 operates to determine or measure the difference between the last line time base error and the next to last line time base error. This difference is employed as a representation of the line to line change in the progressive time base error between vertical blanking intervals. This time base error difference is added by a signal adder 44 to the time base error of each next to last line preceding each of the subsequent normal head switching times that occur until the next delayed head switching is effected during the succeeding vertical blanking interval. Control of the adder 44 to assure that the time base error difference is added to the correct time base error is accomplished by control logic 60. Each of the additions of time base error difference and next to last line time base error generated between the successive vertical blanking intervals is used to compensate for a part of the residual last line time base error occurring between the successive vertical blanking intervals, all of the additions resulting in fully compensating for such residual last line time base error. While such compensation is an approximation of the actual last line error present in each last line before magnetic head transducer switching times, in actual practice, the approximation is very close to the actual last line time base error. The foregoing and other features of the present invention will be more readily understood from the following detailed description of one embodiment of the last line time base error compensator.

Last line corrector 40 is connected between the output of the velocity error measure circuit 32 and the input of the error correction generator circuit 34. The last line corrector 40 is controlled by control logic 60 in a manner to be explained. At all times, the velocity error measure circuit 32 operates in its normal fashion to compare successively received color burst synchronizing information and provide, line by line, a signal indicative of the change in time base that occurs between the successively received bursts. This change represents the progressive time base error in the line between successively received bursts. Our above mentioned application Ser. No. 554,886 describes line by line progressive time base error measuring devices.

At about the beginning of the last line before head switching, a next to last line time base error signal is provided. The time base error signal is provided in the form of a dc voltage whose level is proportional to the progressive time base error that occurs during a line. In response to commands issued by the last line control logic 60, the next to last line time base error signal is sampled and held by the enabled next to last line error hold 42, while simultaneously being applied to the error correction generator circuit 34 for effecting the compensation of the progressive time base error in the next to last line.

During the vertical blanking interval, the control logic 60 operates to delay the switching of the head that terminates its signal reproduction. The delay is adjusted to permit the head that reproduces the last line to also reproduce a color burst synchronizing signal following the last line in the vertical blanking interval to maintain a continuous time base between that color burst and that preceding the last line. By thusly delaying the head switching, the velocity error measure circuit 32 receives the necessary information to produce a last line time base error signal. In response to commands issued by the last line control logic 60, the last line time base error signal is sampled and held by last line error hold 46 and simultaneously applied to the error correction generator circuit 34 to be utilized thereby for effecting the compensation of the progressive time base error in the last line. In this fashion, the last line time base or velocity error is directly measured prior to head switching in the vertical interval and appropriate correction made.

The outputs of the next to last line error hold 42 and last line error hold 46 are connected to dc subtractor 48, which determines the difference between the dc signals held by the two error hold circuits and applies that difference to the input of a last line difference error hold 52. As previously discussed, this difference is closely representative of all line by line changes in the progressive time base error during one television field. The error hold 52 is commanded by the control logic 60 to sample and hold the difference between the last and next to last progressive time base errors for utilization at head switching times prior to the next vertical blanking interval. Each error hold 42, 46, 52 includes a storage device such as a capacitor for holding the sampled dc value.

As previously disclosed, the moment of head switching is determined by application of a signal corresponding to a horizontal sync pulse provided by sync separator 28 to the clock input, C, of D flip-flops 26. For last line error correction, a switch timing inhibit circuit 62, which forms a component of last line control logic 60, is inserted between sync separator 28 and C input of D flip-flops 26. Switch timing inhibit 62 is normally closed to apply horizontal sync pulse corresponding signals to flip-flops 26.

Sync separator 28 also produces a signal corresponding to a vertical sync pulse occurring during each vertical blanking interval prior to the head switching time. This vertical sync pulse corresponding signal is applied to the control terminal of a normally open vertical head switch 64. A head switch signal is produced by tach logic 24 at the same time that switch enable signals are applied by tach logic 24 to data inputs, D, of the D flip-flops 26. The head switch signal is applied to one side of the vertical head switch 64. When a vertical sync pulse corresponding signal is applied to the control terminal of the vertical head switch 64 during the vertical interval, switch 64 closes for a time to permit the following head switch signal to be applied to a head switch delay pulse former 66. In NTSC standard television signal VTR's, the head switch signal occurs approximately 9 lines or 570 usec. after the beginning of the vertical sync pulse. Hence, the vertical head switch 64 remains closed for about 570 usec. The pulse former 66 responds to the applied head switch signal to produce a timed pulse, preferably, of a duration at least equal to that of the horizontal line synchronizing interval, which is applied to the control input of a switch timing inhibit 62 to delay its closing for a duration necessary to inhibit application of the then present horizontal sync pulse corresponding signal to the flip-flops 26. The moment of head switching is thereby delayed until the next horizontal sync pulse corresponding signal following the timed pulse is applied by sync separator 28 through the closed switch timing inhibit 62 to D flip-flops 26.

When vertical head switch 64 is closed, the head switch signal is also applied to the input of a last line sample pulse former 68 and the input of an error hold sample logic 72. These latter circuits include counters and pulse circuits to time the formation of pulses to control error holds 42, 46 and 52 to sample and hold the line by line time base error signals generated by velocity error measure circuit 32. During the vertical interval, when last line velocity error is measured and corresponding signal generated by circuit 32, the error information in last line corrector 40 is updated by the pulse former and logic circuits 68 and 72. Sample logic 72 has two outputs, one of which is connected to next to last line error hold 42 and the other to last line error hold 46. The sample logic 72 is responsive to the head switch signal provided by the vertical head switch 64 upon the occurrence of the vertical sync pulse corresponding signal to issue a command signal to the next to last line error hold 42 to enable same to sample and hold the next to last line time base error signal output by the velocity error measure circuit 32. Since the next to last line time base error is available from the velocity error measure circuit 32 upon occurrence of the head switch signal, the sample logic 72 issues the sampling command to the next to last line error hold 42 upon receipt of the head switch signal provided by the vertical head switch 64. Because the last line time base error signal is not available from the velocity error measure circuit until one line after the next to last line time base error signal, the second commond is generated by the sample logic 72 and provided to the last line error hold 46 about 63.5 usec. after the head switch signal.

Each of the error holds 42 and 46, respectively, respond to the two commands to be enabled to sample and hold the next to last line and last line error signals produced by the velocity error measure circuit 32. Sample pulse former 68 produces a further pulse command at a time shortly, i.e., a few usec., after the second command. This further pulse command is applied to the control input of a last line difference error hold 52 to cause it to sample and hold the difference error signal generated by subtractor 48 after error holds 42 and 46 are updated. It can be seen, therefore, that last line corrector 40 determines the last line difference error during each vertical interval under the control of last line control logic 60.

Each head switch signal, which is generated by tach logic 24 at the end of each head pass, is applied to the control terminal of a last line correction switch 54 each time the heads are switched. At head switches which occur between vertical blanking intervals, as well as just prior to the delayed head switch during the vertical blanking interval, the last line correction switch 54 is closed in response to the head switch pulse applied thereto by tach logic 24. The difference error signal which is stored in difference error hold 52 is applied to adder 44 when last line correction switch 54 is closed. In adder 44, the difference error signal is added to the next to last line velocity error determined by measure circuit 32 in a normal fashion to form each last line velocity error which is provided to the error correction generator circuit 34.

The present invention, therefore, produces last line velocity error compensation with a resultant increase in color video fidelity.

We claim:

1. A method of determining last line velocity error in a time varying signal including time base information reproduced from a record medium by a plurality of transducers between which reproduction of the signal is switched comprising the steps of determining the last line velocity error occurring during a certain last determined period of said signal before transducer switchings, and adjusting each of the last line velocity errors occurring during other last determined periods of said signal before transducer switchings in accordance with said determined last line velocity error.

2. The method of claim 1 wherein said last line velocity error determining step includes delaying the reproduction terminating switching of the transducer reproducing said certain last determined period of said signal to reproduce signal time base information during the switching delay interval, and comparing said signal time base information reproduced during the switching delay interval and the signal time base information reproduced prior to said certain determined period of said signal to obtain said last line velocity error.

3. The method of claim 1 wherein said velocity error adjusting step includes determining the difference between said determined last line velocity error and the next to last line velocity error occurring during a determined period of said signal immediately prior said last determined period, and adding said determined difference to said last line velocity errors occurring during other last determined periods of said signal before transducer switchings.

4. The method of claim 3 wherein said last line velocity error determining step includes delaying the reproduction terminating switching of the transducer reproducing said certain last determined period of said signal to reproduce signal time base information during the switching delay interval, and comparing said signal time base information reproduced during the switching delay interval and the signal time base information reproduced prior to said certain determined period of said signal to obtain said last line velocity error.

5. The method of claim 1 wherein said time varying signal includes data information organized in periods with each period preceded by synchronizing information providing signal time base information; said transducer switching occurs during said synchronizing information; said last line velocity error determining step includes delaying the reproduction terminating switching of the transducer reproducing a certain last period before synchronizing information during which transducer switching occurs to reproduce that synchronizing information, and comparing said synchronizing information reproduced during the switching delay interval and the synchronizing information reproduced prior to said certain last period to obtain said last line period velocity error; and said velocity error adjusting step includes determining the difference between said determined last line velocity error and the next to last line velocity error occurring during a period prior said certain last period, and adding said determined difference to said last line velocity errors occurring during other last periods before following transducer switchings.

6. The method of claim 5 wherein said time varying signal is a color television signal including video data information interrupted by intervals of horizontal line synchronizing information and intervals of vertical blanking synchronizing information devoid of essential video data information, said horizontal line synchronizing information includes a horizontal line sync pulse and color synchronizing information, said vertical blanking synchronizing information includes periodic horizontal line synchronizing information, one of the switchings occurs during the vertical blanking synchronizing information, the reproduction terminating switching of a transducer that occurs in the vertical blanking synchronizing information is delayed to produce color synchronizing information occurring after a period of successive horizontal line sync pulses, and the phases of successively reproduced color synchronizing information are compared.

7. The method of claim 6 wherein said color synchronizing information is a signal burst of known frequency occurring during the horizontal line synchronizing information.

8. In apparatus for reproducing time varying signals from a record medium with successive ones of a plurality of transducers between which switching occurs, said signals including time base information, the combination comprising means for producing from successive periodically reproduced time base information discrete period by period representations of the progressive time base error occurring during the period determined by said successive reproduced time base information, and means for delaying the reproduction terminating switching of a transducer that occurs after it reproduces a certain last determined period of said signal to effect reproduction of signal time base information during the switching delay interval.

9. The apparatus of claim 8 further comprising means for ajdusting each of the period by period representations of the progressive time base error occurring during other last determined periods of said signal before transducer switchings in accordance with the period by period representation of the progressive time base error of said certain last determined period.

10. The apparatus of claim 9 wherein said adjusting means includes a differential comparator coupled to compare the representation of the progressive time base error occurring during said certain last determined period of said signal and a representation of the progressive time base error occurring during the determine period of said signal previous said last determined period to provide a representation of the difference in said compared time base errors, and means for adding the represented difference in said compared time base errors to each period by period representation of the progressive time base error occurring during other last determined periods of said signal before transducer switchings.

11. The method of claim 10 wherein said time varying signal includes data information organized in periods with each period preceded by synchronizing information providing signal time base information, said signal periodically including intervals of consecutive synchronizing information devoid of essential data information, said transducer switching occurs during said synchronizing information of said interval, and said switching delay means delays the reproduction terminating switching of a transducer that occurs after it reproduces a last period of said signal in said interval.

12. The apparatus of claim 11 wherein said adjusting means further includes a first signal storage means coupled to store each representation of the progressive time base error occurring previous to said last determined period, and a second signal storage means coupled to store each representation of previous time base error occurring during the said last determined period, and wherein said differential comparator is coupled to compare the stored representations.

13. The apparatus according to claim 11 wherein said time varying signal is a color television signal including video data information interrupted by intervals of horizontal line synchronizing information and intervals of vertical blanking synchronizing information devoid of essential video data information, said horizontal line synchronizing information includes a horizontal line sync pulse and color synchronizing information, said vertical blanking synchronizing information includes periodic horizontal line synchronizing information, said transducer switching occurs during said vertical blanking interval, and said switching delay means delays the reproduction terminating switching of said transducer until after reproduction of color synchronizing information following consecutive horizontal line sync pulse.

14. The apparatus of claim 13 wherein said adjusting means further includes a first signal storage means coupled to store each representation of the progressive time base error occurring previous to said last determined period, and a second signal storage means coupled to store each representation of previous time base error occurring during the said last determined period, and wherein said differential comparator is coupled to compare the stored representations.

15. The apparatus of claim 14 further including a normally closed switching means coupled to receive and issue commands to affect transducer switching, and a gate signal generator responsive to the occurrence of each vertical blanking interval to generate a gating signal, said switching means responsive to said gating signal to open and delay the issuance of a transducer switching command.

16. In a multi-transducer television signal reproducing apparatus having a velocity compensator which produces discrete line by line progressive time base error signals from synchronizing information in the television signal, means for correcting progressive time base error in the last line of each transducer reproduction operation comprising means for delaying switching between transducers during a vertical blanking interval of the reproduced television signal to reproduce and apply said synchronizing information to the velocity compensator to thereby obtain the last line velocity error during the vertical blanking interval, means coupled to compare the last line velocity error signal during the vertical interval and a next to last line velocity error signal produced by said velocity compensator during the vertical interval to obtain a signal representative of the difference between said compared velocity error signals, and means for adding to the next to last line velocity error signals produced during transducer reproduction operations between vertical blanking intervals an adjustment corresponding to said difference to thereby provide a last line velocity error between vertical intervals.

17. In a system having a plurality of transducers for reproducing a signal composed of a series of data information lines and having occasionally occurring blank intervals devoid of essential data which is recorded in a medium along a plurality of discontinuous tracks and having a progressive line by line time base error compensator which produces discrete line by line error signals, means for correcting velocity error in the last line of each transducer reproduction operation comprising means for delaying the reproduction termination switching of a transducer during each blank interval to apply a signal to said compensator to thereby obtain the last line time base error during said blank interval, means to determine the difference between the next to last line time base error and the last line time base error during said blank interval, and means to adjust the next to last line time base error during following transducer reproduction operations before the succeeding blank interval to thereby provide a last line velocity error signal.

\* \* \* \* \*